UNITED STATES PATENT OFFICE.

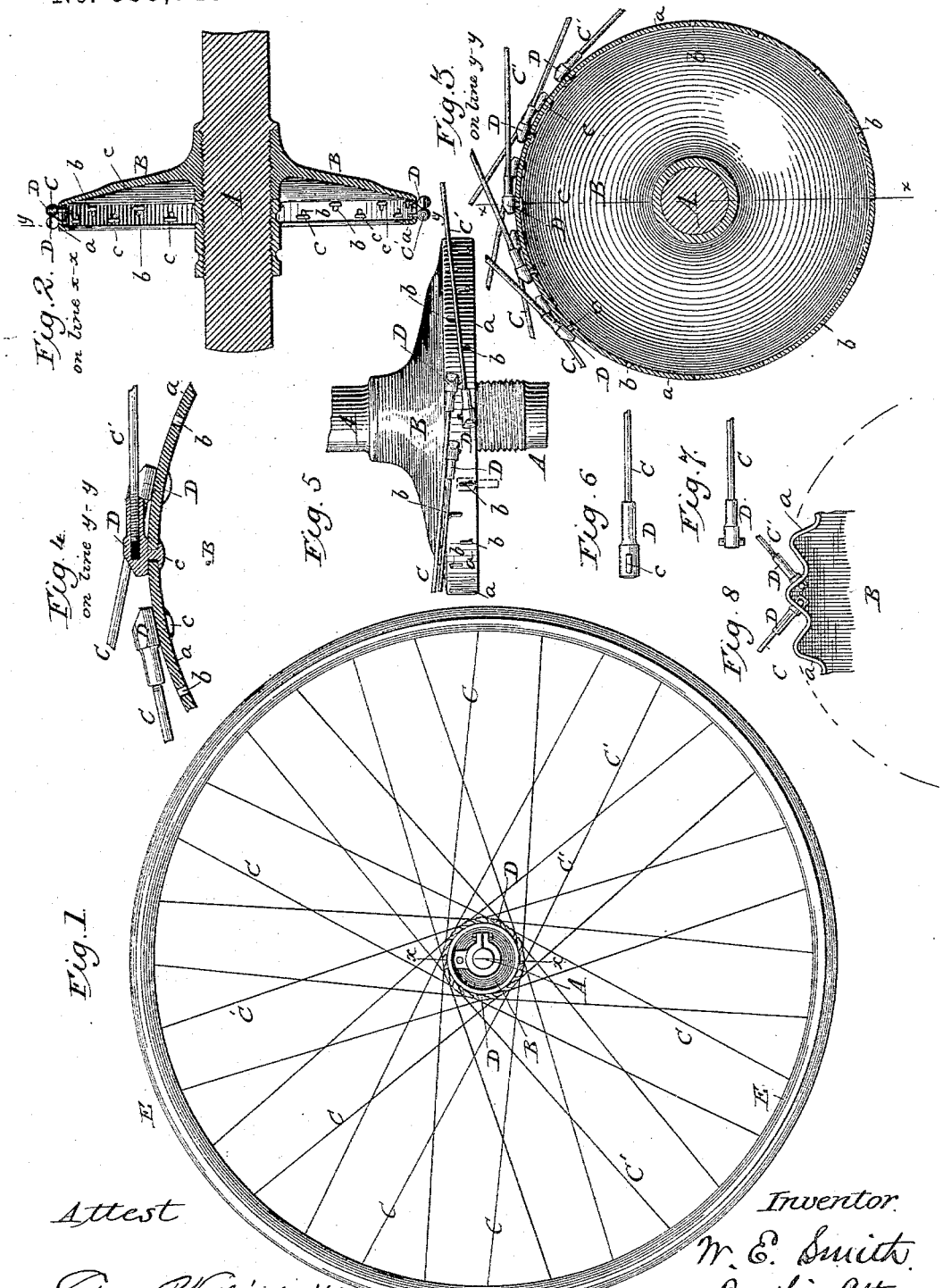

WILLIAM ED. SMITH, OF WASHINGTON, DISTRICT OF COLUMBIA.

WHEEL.

SPECIFICATION forming part of Letters Patent No. 359,745, dated March 22, 1887.

Application filed April 1, 1886. Serial No. 197,418. (No model.)

*To all whom it may concern:*

Be it known that I, WILLIAM EDWARD SMITH, of Washington, in the District of Columbia, have invented certain Improvements in Bicycle-Wheels and other Wheels, of which the following is a specification.

This invention relates to improvements in that class of wheels used for bicycles, tricycles, and other vehicles which are commonly known at the present day as "suspension-wheels," and in which the hub is carried by strained wire spokes extending thence to the rim or felly.

It is the aim of my invention to provide for the secure attachment, convenient adjustment, and ready renewal of the spokes, and to arrange the spokes in such manner that they will receive direct longitudinal strains and be wholly free from liability to the lateral strains which so frequently cause their breakage in other wheels.

To this end the invention consists in spokes which extend tangentially from the hub to the rim, and which are connected to the hub by nuts having a rocking or a pivotal action, so that they may adjust themselves to any change in the position of the spokes with reference to the hub.

It also consists in nuts which receive the inner ends of the spokes, and which are detachably connected to the hub in such manner that they are held in position and prevented from unlocking by the strain of the spokes.

It further consists in various details, which will be hereinafter fully explained.

My improvements are susceptible of embodiment in different forms; but I have represented in the drawings those details of form and arrangement which are deemed best for general use.

Referring to the accompanying drawings, Figure 1 represents a side elevation of a wheel constructed on my plan; Fig. 2, an axial section through one side of the same on the line $x\ x$; Fig. 3, a transverse section on the line $y\ y$ of Fig. 2; Fig. 4, an enlarged sectional view on the same line through one of the spoke-retaining nuts and the adjacent parts; Fig. 5, a top plan view of the hub; Fig. 6, an inside view of one of the nuts. Figs. 7 and 8 are views of modifications.

Referring to the drawings, A represents the axle; B, one of the hubs or flanges; C, the wire spokes; D, the nuts by which the inner ends of the spokes are secured to the hub; and E, the rim or felly, which is shown of the usual U form, with an elastic tire secured in its outer face.

The axle will be provided, as usual in this class of wheels, with two hubs or flanges secured firmly to its opposite ends. The spokes, being staggered, are carried to the respective hubs alternately, as usual. Each hub is constructed with an annular peripheral flange, $a$. In this flange there are formed a series of openings, $b$, elongated in the direction of the axis, as shown in Fig. 5, or made of a tapering form, as shown in Fig. 6, or otherwise constructed that the nuts may be locked therein, as hereinafter explained.

Each of the nuts D has a tubular internally-threaded body, into which the end of a single spoke is secured, as plainly shown in the several figures. Each nut is formed on one side with a projecting stud or neck, having an enlarged head, $c$, of a form adapted to enter the openings $b$ in the hub. The head is arranged in such position that the nut must be turned at right angles to its operative position, as shown by dotted line in Fig. 5, in order to admit of the head being inserted through the opening in the hub. After being thus inserted, the nut is secured by turning it to its operative position, whereby its head is caused to interlock with the inner face of the flange, so that it cannot escape therefrom. The spokes are secured on the rim in any suitable manner which will admit of their being revolved. After each nut is in position its spoke is inserted and turned by suitable tools until it is secured firmly in place in the nut and brought to the required tension.

It will be observed that the spoke prevents the nut from turning in such manner as to disengage from the hub. If, however, a spoke be unscrewed or broken, the nut is thereby released, so that it may be readily detached from the hub.

It will be perceived that in my wheel each spoke is applied tangentially to the hub. The nuts are fitted to the hub in such a manner as to permit a slight rocking and tipping action.

Owing to this fact, and to the fact that the spokes are applied tangentially to the hub, the nuts will at all times conform to the position of the spokes, so that the rotation of the hub by means of the crank or other operating device will apply strains to the spokes in a longitudinal direction only.

It is a well-known fact that when spokes are secured rigidly and radially into the hub they are frequently broken, owing to the fact that the hub, turning the head slightly in advance of the rim, will bend the inner ends of the spokes. Under my construction this evil is wholly avoided, as it is impossible for the hub to strain the spokes except in the direction of their longitudinal axis.

The essence of my invention resides in the connection of the tangential spokes to the hub by nuts having a limited rocking or pivotal action with reference to the hub, so that they may adjust themselves at all times to the position of the spokes. The external forms of the nuts, of their projections for engaging the hub, and of the notches in the hub may be modified at will. In place of the narrow transverse slots, as shown in Fig. 5, slots of a form shown in Fig. 6 may be used. These slots are enlarged at one end to admit the stud C, which is secured by sliding it forward until its neck enters the narrow portion of the slot.

Instead of inserting the nuts, as above described, they may be made of the form shown in Fig. 7, and inserted into openings in a flange of serpentine form, as shown in Fig. 8, or of other equivalent form.

Any suitable number of spokes may be used in the wheel, and they may be arranged in any suitable manner to each other, provided they are applied tangentially, or substantially so, to the hub. I recommend, however, the employment, as shown in Fig. 1, of two series of spokes, one series extending backward from the hub to receive the principal strains in turning the wheel forward, and the other series, C', extending forward from the hub to receive the principal strains when the wheel is turned backward. Thus arranged, they will cross and oppose each other, as shown in the drawings, and will jointly sustain the hub rigidly in position.

I am aware that radial spokes have been passed through flaring openings in a hub, with nuts applied from the interior, and also that tangential spokes have been passed through holes in or wound around studs upon a hub; but I believe myself to be the first to employ a connection with the spokes arranged at a tangent to the hub, the nuts connecting each being free to adjust themselves upon the hub, and the first to employ with a hub externally-applied nuts held in position by the strain of the spokes, and adapted for instantaneous detachment after the removal or breakage of the spokes.

Having thus described my invention, what I claim is—

1. In a suspension-wheel, the combination of a hub, a series of spokes extending tangentially with reference to the hub, and connecting-nuts receiving the ends of the spokes and attached to the hub, substantially as described, so that they may rock or tip thereon to a limited extent, whereby they are adapted to adjust themselves to the varying positions of the spokes and thus avoid lateral strains upon the latter.

2. A hub provided with an annular side flange having openings therein, in combination with external spoke-receiving nuts provided with studs or ears detachably engaged in said openings.

In testimony whereof I hereunto set my hand, this 22d day of March, 1886, in the presence of two attesting witnesses.

WILLIAM ED. SMITH.

Witnesses:
P. T. DODGE,
JOHN T. ARMS.